(12) United States Patent
Major

(10) Patent No.: US 8,506,819 B2
(45) Date of Patent: Aug. 13, 2013

(54) SYSTEM AND METHOD OF FILTERING METALWORKING FLUID

(76) Inventor: Gary Major, Orlando, FL (US)

(\*) Notice: Subject to any disclaimer, the term of this patent is extended or adjusted under 35 U.S.C. 154(b) by 438 days.

(21) Appl. No.: 12/577,773

(22) Filed: Oct. 13, 2009

(65) Prior Publication Data
US 2010/0089833 A1   Apr. 15, 2010

Related U.S. Application Data

(60) Provisional application No. 61/104,902, filed on Oct. 13, 2008.

(51) Int. Cl.
*C02F 1/40* (2006.01)

(52) U.S. Cl.
USPC ...... 210/691; 210/167.31; 210/171; 210/258; 210/259; 210/484; 210/502.1; 210/805; 210/806

(58) Field of Classification Search
USPC ............... 210/167.04, 167.31, 171, 281, 282, 210/484, 502.1, 508, 691–693, 805–807, 210/924, 258, 259, 266, 287–289, 291
See application file for complete search history.

(56) References Cited

U.S. PATENT DOCUMENTS

| | | | |
|---|---|---|---|
| 2,278,488 A * | 4/1942 | Ralston | 210/282 |
| 3,456,798 A * | 7/1969 | Urdanoff | 210/776 |
| 3,608,734 A | 9/1971 | Schneider | |
| 3,750,847 A | 8/1973 | Sluhan | |
| 4,061,573 A * | 12/1977 | Biron | 210/282 |
| 4,343,680 A * | 8/1982 | Field et al. | 210/691 |
| 4,775,473 A * | 10/1988 | Johnson et al. | 210/484 |
| 4,913,815 A * | 4/1990 | Shulda | 210/287 |
| 4,966,693 A | 10/1990 | Brandt et al. | |
| 5,104,529 A * | 4/1992 | Becker | 210/195.1 |
| 5,599,457 A * | 2/1997 | Fanning et al. | 210/669 |
| 5,983,910 A | 11/1999 | Berger et al. | |
| 5,992,642 A | 11/1999 | Ota | |
| 6,132,612 A * | 10/2000 | Bourgeois | 210/282 |
| 6,287,459 B1 * | 9/2001 | Williamson | 210/99 |
| 6,616,834 B2 * | 9/2003 | Anderson | 210/155 |
| 6,641,738 B2 * | 11/2003 | Hard | 210/693 |
| 7,338,606 B2 | 3/2008 | Bratten | |
| 2006/0201888 A1 | 9/2006 | Snell et al. | |

FOREIGN PATENT DOCUMENTS

JP   54124873 A  *  9/1979

\* cited by examiner

*Primary Examiner* — Matthew O Savage
(74) *Attorney, Agent, or Firm* — McKinney Law, PLLC

(57) ABSTRACT

A system and method of filtering metalworking fluid is disclosed. A particle filter is provided in fluid communication with a sump of machining equipment to filter particles from a metalworking fluid. The metalworking fluid is filtered using the particle filter to remove metal filings and debris from the metalworking fluid. A tramp oil filter is provided in fluid communication with the particle filter to remove tramp oil, wherein the tramp oil filter includes hydrophobic material to absorb oil. The oil-free metalworking fluid may then be re-circulated back to the machining equipment.

9 Claims, 4 Drawing Sheets

US 8,506,819 B2

SYSTEM AND METHOD OF FILTERING METALWORKING FLUID

CROSS-REFERENCED TO RELATED APPLICATIONS

This application claims the benefit of U.S. Provisional Application Ser. No. 61/104,902, filed Oct. 13, 2008, the entirety of which is incorporated herein by reference.

FIELD OF THE DISCLOSURE

The present disclosure is generally related to a system and method of filtering metalworking fluid.

BACKGROUND

Metalworking fluid is used to cool machining equipment such as computer numerical control ("CNC") machining equipment. The metalworking fluid is required to cool tooling and metal parts of the machining equipment, which are susceptible to increased temperatures during a machining process. Increased temperatures will wear the parts and decrease the overall efficiency of the machining equipment. The metalworking fluid is typically water soluble and may contain an extreme pressure lubricant. The metalworking fluid may be stored in a sump or tank located under the machining equipment. In use, the metalworking fluid will flow down and be collected in the sump for recirculation through the machining equipment. The sump will also collect other fluids such as way oil, air set oil and other types of petroleum based fluids known as "tramp oil." The tramp oil contaminates the metalworking fluid, which is then recirculated through the machining equipment. The contaminated metalworking fluid reduces the life of the metalworking fluid and machining equipment.

There have been attempts to address the contaminated metalworking fluid such as a disk skimmer that uses a slender plastic wheel that dips down into the sump. As the wheel rotates back up out of the sump, a wiper mechanism removes the tramp oil that happens to adhere to the plastic wheel. A shortcoming of the device is that only a limited volume of metalworking fluid is processed as determined by the surface area of the wheel. This is a shortcoming of a similar skimming type system that uses a belt or tube that dips down into the metalworking fluid instead of a wheel.

Another example of the prior art is a tramp oil separator device. The contaminated metalworking fluid is extracted from the machining equipment sump and pumped into a vessel that allows the tramp oil to float to the top of the vessel where it is siphoned off. However, the remaining metalworking fluid is not completely removed of tramp oil through the separation process and is a relatively slow processing method.

It is, therefore, to the effective resolution of the aforementioned problems and shortcomings of the prior art that the present invention is directed.

DETAILED DESCRIPTION

Figure 1:
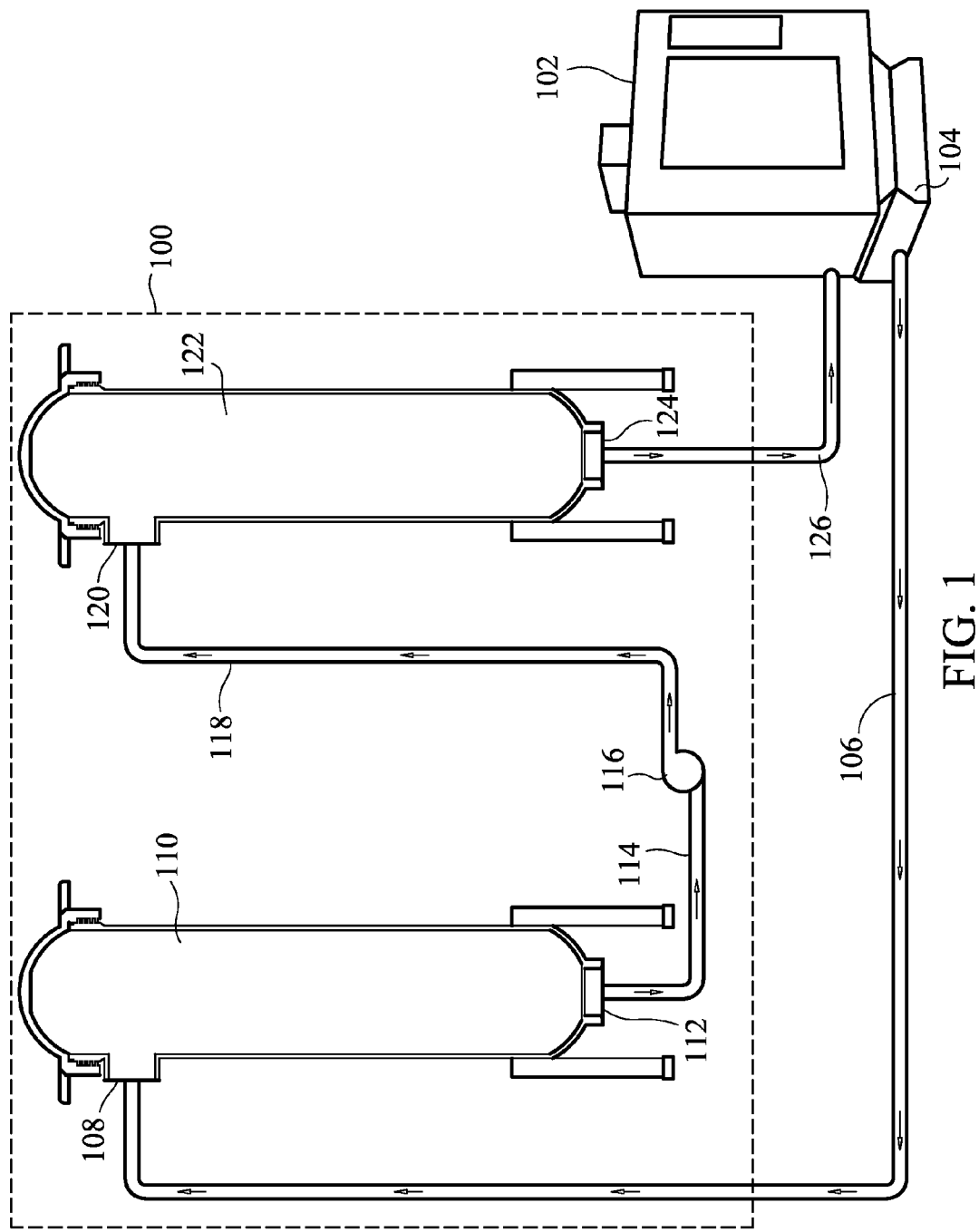
FIG. 1 is a schematic diagram of a particular illustrative embodiment of system of filtering metalworking fluid.

FIG. 1 is a schematic diagram of a system of filtering metalworking fluid, generally designated 100. The system is in fluid communication via inlet piping 106 with machining equipment 102. A sump 104 is located under the machining equipment 102 and serves to collect the metalworking fluid for processing by the system 100. The metalworking fluid is pumped through the inlet piping 106 to an inlet port 108 located on particle filter 110. The particle filter 110 removes any metal filings or small pieces that may collect in sump 104 and serves to protect pump 116. Outlet piping 114 of the particle filter 110 connects an outlet port 112 of the particle filter 110 to the pump 116. The pump may be a pneumatic type pump. Inlet piping 118 is connected to the higher pressure side of the pump 116 and to an inlet port 120 of the tramp oil filter 122 so that the metalworking fluid flows from the particle filter 110 to the tramp oil filter 122. The tramp oil filter 122 includes a filter pod (shown in FIGS. 2-4) that contains hydrophobic material. As the metalworking fluid passes through the tramp oil filter, the filter pod absorbs any tramp oil that may be contaminating the metalworking fluid. The filter pod will not absorb the water soluble metalworking fluid. Accordingly, as the metalworking fluid passes through the tramp oil filter 122, the metalworking fluid becomes less contaminated until all tramp oil is removed and the metalworking fluid exits the tramp oil filter 122 through outlet port 124. Piping 126 is in fluid communication between the outlet port 124 and the machining equipment 102.

A particular advantage of the system of filtering metalworking fluid is that the system can be used while the machining equipment is running or shut down.

Figure 2:
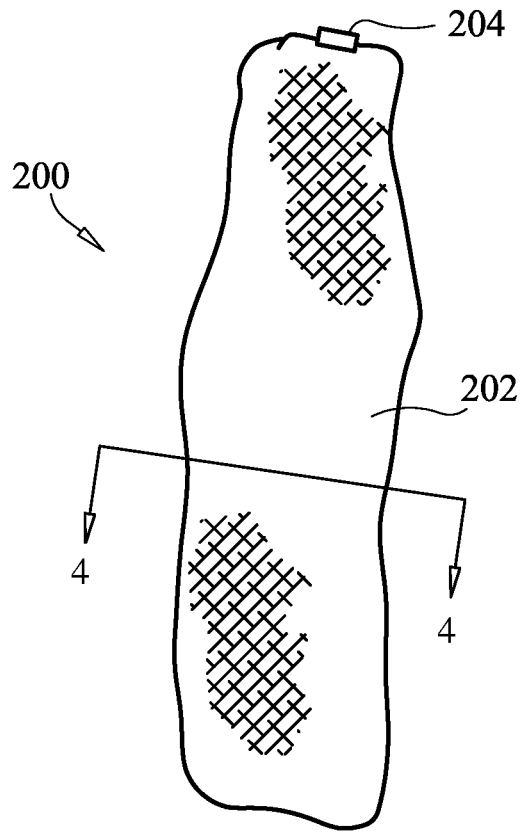
FIG. 2 is a front view of a particular illustrative embodiment of a filter pod element of the system of filtering metalworking fluid.
Figure 3:
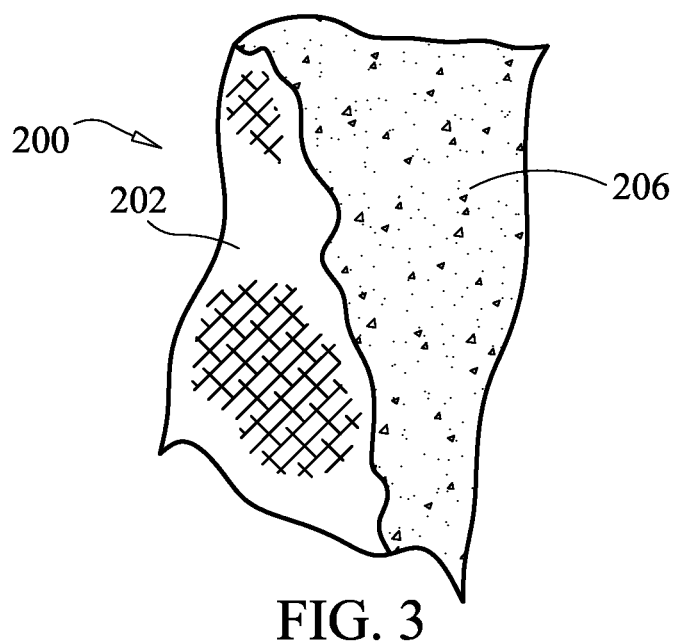
FIG. 3 is a partial cut-away view of the filter pod element of the system of filtering metalworking fluid shown in FIG. 2.

FIG. 2 is a front view of the filter pod 200 and may include a cellulosed based hydrophobic material 206 as shown in FIG. 3. A flexible and porous material 202 of the filter pod 200 is used to contain the hydrophobic material 206. The hydrophobic material 206 will only absorb petroleum (oil based) products such as the tramp oil. After absorption, the filter pod 200 will not leach (leak) the tramp oil back into the metalworking fluid. The tramp oil essentially becomes a part of the molecular structure of the hydrophobic material 206. A closure device 204 is disposed on one end of the filter pod 200 and may be used to access the filter pod 200 to fill with hydrophobic material 206. The filter pod absorption capacity may be approximately 1.8 gallons of tramp oil.

Another particular advantage of the system of filtering metalworking fluids is that the filter pods 200 are disposable and easily removed from the tramp oil filter 122 when at absorption capacity. In addition, disposal of the tramp oil trapped in the hydrophobic material 206 can be easily accomplished by disposing of the filter pod 200 in accordance with applicable federal and state environmental regulations. The system 100 extends the usable life of the water based metalworking fluid and the machining equipment by preventing corrosion and controlling bacterial contamination.

Figure 4:
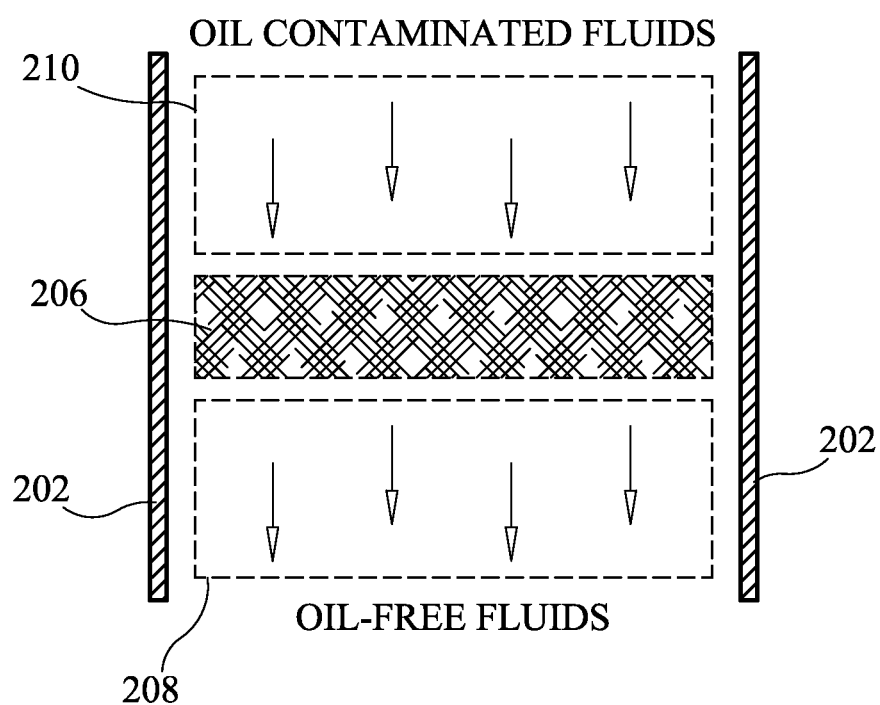
FIG. 4 is a cross sectional view of the filter pod element taken along line 4-4 shown in FIG. 2 of the system of filtering metalworking fluid.

Referring now to FIG. 4, a cross sectional view of the filter pod 200 is shown. As the oil contaminated fluid 210 passes through the filter pod 200, the hydrophobic material 206 absorbs any tramp oil from the contaminated fluid 210. The hydrophobic material 206 does not absorb the water soluble metalworking fluid. The metalworking fluid becomes less contaminated as it flows through the hydrophobic material 206 until all tramp oil is removed and the oil-free fluid 208 exits the hydrophobic material 206 and the filter pod 200.

Figure 5:
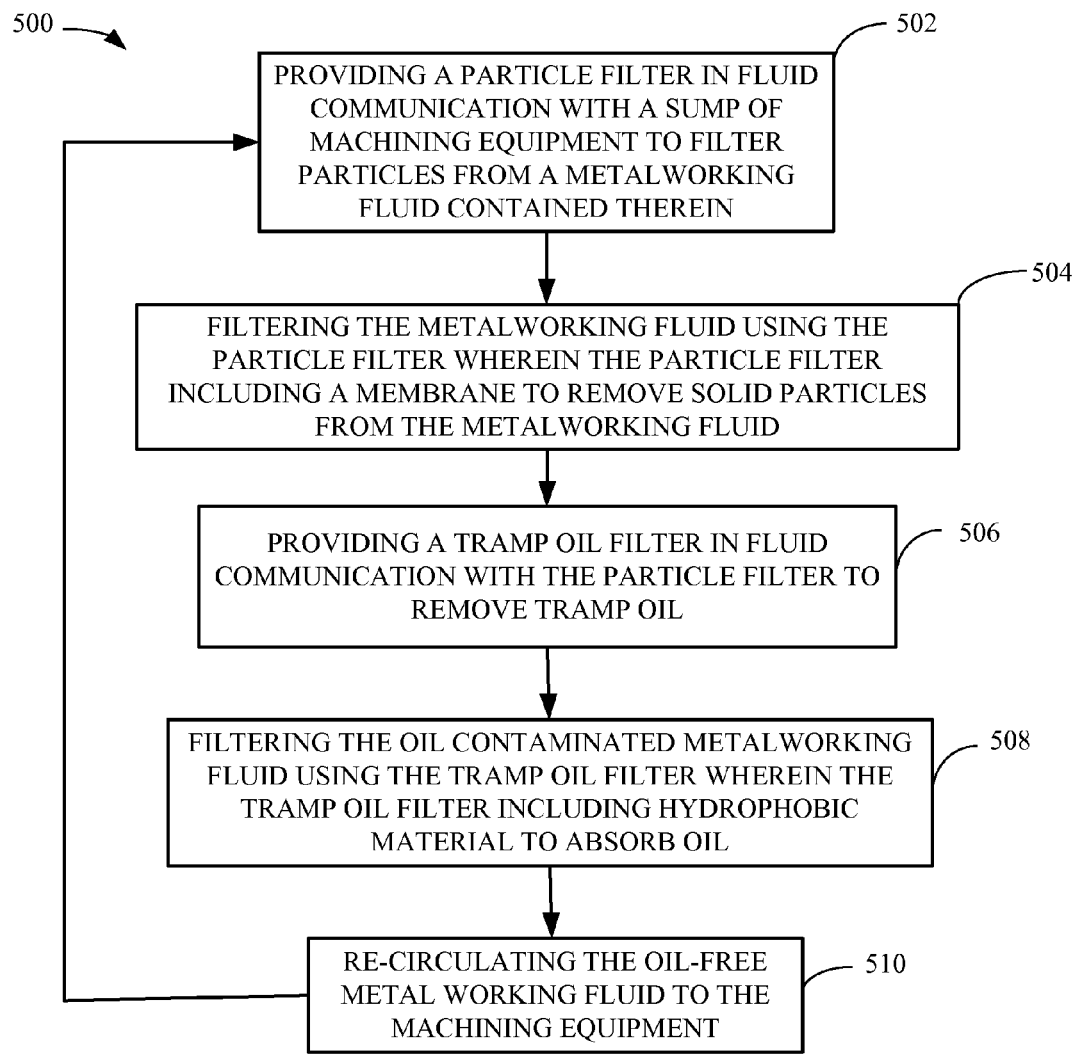
FIG. 5 is a flow chart of a particular illustrative embodiment of a method of filtering metalworking fluid.

FIG. 5 is a flow diagram of a particular illustrative embodiment of a method of filtering metalworking fluid. The method includes providing a particle filter in fluid communication with a sump of machining equipment to filter particles from a metalworking fluid contained therein, at 502. The metalworking fluid is filtered using the particle filter wherein the particle filter includes a membrane to remove solid particles from the metalworking fluid, at 504. Proceeding to 506, a tramp oil filter is provided in fluid communication with the particle filter to remove tramp oil. The oil contaminated metalworking fluid is then filtered, at 508, using the tramp oil filter wherein the tramp oil filter includes hydrophobic material to absorb oil. The oil-free metalworking fluid may then be re-circulated back to the machining equipment, at 510.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system of filtering metalworking fluid, the system comprising:
    a machine including a sump for receiving used water soluble metalworking fluid;
    a particle filter for removing particles from the used soluble metalworking fluid;
    first piping extending from the sump to an inlet of the particle filter for directing used fluid from the sump to the particle filter;
    a tramp oil filter configured to receive filtered water soluble metalworking fluid from the particle filter;
    a removable filter pod configured to fit within the tramp oil filter;
    a flexible and porous outer layer of the filter pod is configured to allow metalworking fluid to flow there-through;
    hydrophobic material is filled within the filter pod to absorb tramp oil from the metalworking fluid;
    wherein the filter pod is configured to be removed from the tramp oil filter when the filter pod is at absorption capacity;
    a pump for pumping filtered fluid from the particle filter to the tramp oil filter;
    second piping extending from an outlet of the particle filter to an inlet of the pump for directing filtered fluid from the particle filter to the pump;
    third piping extending from an outlet of the pump to an inlet of the tramp oil filter for directing filtered fluid from the pump to the tramp oil filter;
    and fourth piping extending from an outlet of the tramp oil filter to the machine for directing purified fluid from the tramp oil filter to the machine;
    whereby fluid is circulated in a closed loop from the machine to the particle filter via the first piping, to the pump via the second piping, to the tramp oil filter via the third piping, and back to the machine via the fourth piping.

2. The system of claim 1, wherein the hydrophobic material is a cellulose based material.

3. The system of claim 2, wherein the filter pod further comprising a closure device on a first end of the filter pod to access the hydrophobic material.

4. The system of claim 3, wherein the absorption capacity of the filter pod is approximately 1.8 gallons of the tramp oil.

5. A method of filtering metalworking fluid, the method comprising:
    providing a machine including a sump for receiving used water soluble metalworking fluid;
    providing a particle filter for removing particles from the used soluble metalworking fluid;
    providing first piping extending from the sump to an inlet of the particle filter for directing used fluid from the sump to the particle filter;
    providing a tramp oil filter configured to receive filtered water soluble metalworking fluid from the particle filter;
    providing a removable filter pod configured to fit within the tramp oil filter, wherein a flexible and porous outer layer of the filter pod is configured to allow metalworking fluid to flow there-through;
    providing hydrophobic material within the filter pod to absorb tramp oil from the metalworking fluid;
    wherein the filter pod is configured to be removed from the tramp oil filter when the filter pod is at absorption capacity;
    providing a pump for pumping filtered fluid from the particle filter to the tramp oil filter;

providing second piping extending from an outlet of the particle filter to an inlet of the pump for directing filtered fluid from the particle filter to the pump;

providing a third piping extending from an outlet of the pump to an inlet of the tramp oil filter for directing filtered fluid from the pump to the tramp oil filter;

and providing fourth piping extending from an outlet of the tramp oil filter to the machine for directing purified fluid from the tramp oil filter to the machine;

circulating the fluid in a closed loop from the machine to the particle filter via the first piping, to the pump via the second piping, to the tramp oil filter via the third piping, and back to the machine via the fourth piping; and removing the filter pod from the tramp oil filter when the filter pod is at absorption capacity.

6. The method of claim 5, wherein the hydrophobic material is a cellulose based material.

7. The method of claim 6, wherein the filter pod further comprising a closure device on a first end of the filter pod to access the hydrophobic material.

8. The method of claim 7, further comprising collecting metalworking fluid in a sump of the machining equipment.

9. The method of claim 8, wherein the absorption capacity of the filter pod is approximately 1.8 gallons of the tramp oil.

\* \* \* \* \*